(12) United States Patent
Jang

(10) Patent No.: US 10,572,726 B1
(45) Date of Patent: Feb. 25, 2020

(54) MEDIA SUMMARIZER

(71) Applicant: Digital Research Solutions, Inc., Salt Lake City, UT (US)

(72) Inventor: Edwin S. Jang, Salt Lake City, UT (US)

(73) Assignee: Digital Research Solutions, Inc., Salt Lake City, UT (US)

( * ) Notice: Subject to any disclaimer, the term of this patent is extended or adjusted under 35 U.S.C. 154(b) by 69 days.

(21) Appl. No.: 15/791,120

(22) Filed: Oct. 23, 2017

Related U.S. Application Data

(60) Provisional application No. 62/411,385, filed on Oct. 21, 2016.

(51) Int. Cl.
*G06K 9/00* (2006.01)
*G06K 9/22* (2006.01)
*G06F 17/27* (2006.01)
*G06F 16/34* (2019.01)
*G06F 16/955* (2019.01)

(52) U.S. Cl.
CPC ....... *G06K 9/00456* (2013.01); *G06F 16/345* (2019.01); *G06F 16/9558* (2019.01); *G06F 17/278* (2013.01); *G06F 17/2785* (2013.01); *G06K 9/228* (2013.01)

(58) Field of Classification Search
CPC .. G06K 9/00456; G06K 9/228; G06F 16/345; G06F 16/9558; G06F 17/278; G06F 17/2785
See application file for complete search history.

(56) References Cited

U.S. PATENT DOCUMENTS

| | | | | |
|---|---|---|---|---|
| 5,907,841 | A * | 5/1999 | Sumita | G06F 16/345 |
| 6,766,287 | B1 * | 7/2004 | Kupiec | G06F 17/274 |
| | | | | 704/9 |
| 7,117,437 | B2 * | 10/2006 | Chen | 715/254 |
| 9,916,383 | B1 * | 3/2018 | Ching | G06F 16/316 |
| 2002/0052901 | A1 * | 5/2002 | Guo | G06F 17/27 |
| | | | | 715/247 |
| 2003/0050927 | A1 * | 3/2003 | Hussam | G06F 16/904 |
| 2004/0054973 | A1 * | 3/2004 | Yamamoto | H01L 67/2823 |
| | | | | 715/234 |
| 2004/0117740 | A1 * | 6/2004 | Chen | 715/210 |
| 2004/0122657 | A1 * | 6/2004 | Brants | G06F 17/2229 |
| | | | | 704/9 |
| 2004/0133560 | A1 * | 7/2004 | Simske | G06F 16/313 |
| 2005/0086224 | A1 * | 4/2005 | Franciosa | G06F 16/3334 |
| 2005/0102619 | A1 * | 5/2005 | Hijikata | G06Q 10/10 |
| | | | | 715/254 |
| 2005/0108266 | A1 * | 5/2005 | Cao | G06F 17/2229 |
| 2007/0073683 | A1 * | 3/2007 | Kobayashi | G06F 16/345 |
| 2010/0145678 | A1 * | 6/2010 | Csomai | G06F 17/241 |
| | | | | 704/9 |

(Continued)

*Primary Examiner* — Aaron W Carter
(74) *Attorney, Agent, or Firm* — Maschoff Brennan

(57) ABSTRACT

A media summarizer may include an inspector, an array, and a generator. The inspector may inspect a document and identify words included in the document. The inspector may further identify information associated with the words included in the document. The array may include the identified words of the document and the identified information associated with the identified words of the document. The generator may generate a summary of the document. The summary may include a subset of the identified words of the document.

20 Claims, 1 Drawing Sheet

(56) References Cited

U.S. PATENT DOCUMENTS

| | | | |
|---|---|---|---|
| 2010/0228693 A1* | 9/2010 | Dawson | G06F 17/2705 706/12 |
| 2010/0313118 A1* | 12/2010 | Acquaviva | G06F 16/367 715/254 |
| 2012/0330951 A1* | 12/2012 | Chakra | G06Q 10/107 707/736 |
| 2014/0229159 A1* | 8/2014 | Branton | G06F 16/345 704/9 |
| 2015/0278702 A1* | 10/2015 | Kawanaka | G06N 5/048 706/52 |
| 2016/0140221 A1* | 5/2016 | Park | G06F 17/27 715/254 |
| 2017/0068654 A1* | 3/2017 | Jeong | G06F 16/93 |
| 2018/0293215 A1* | 10/2018 | Jang | G06F 17/241 |

* cited by examiner

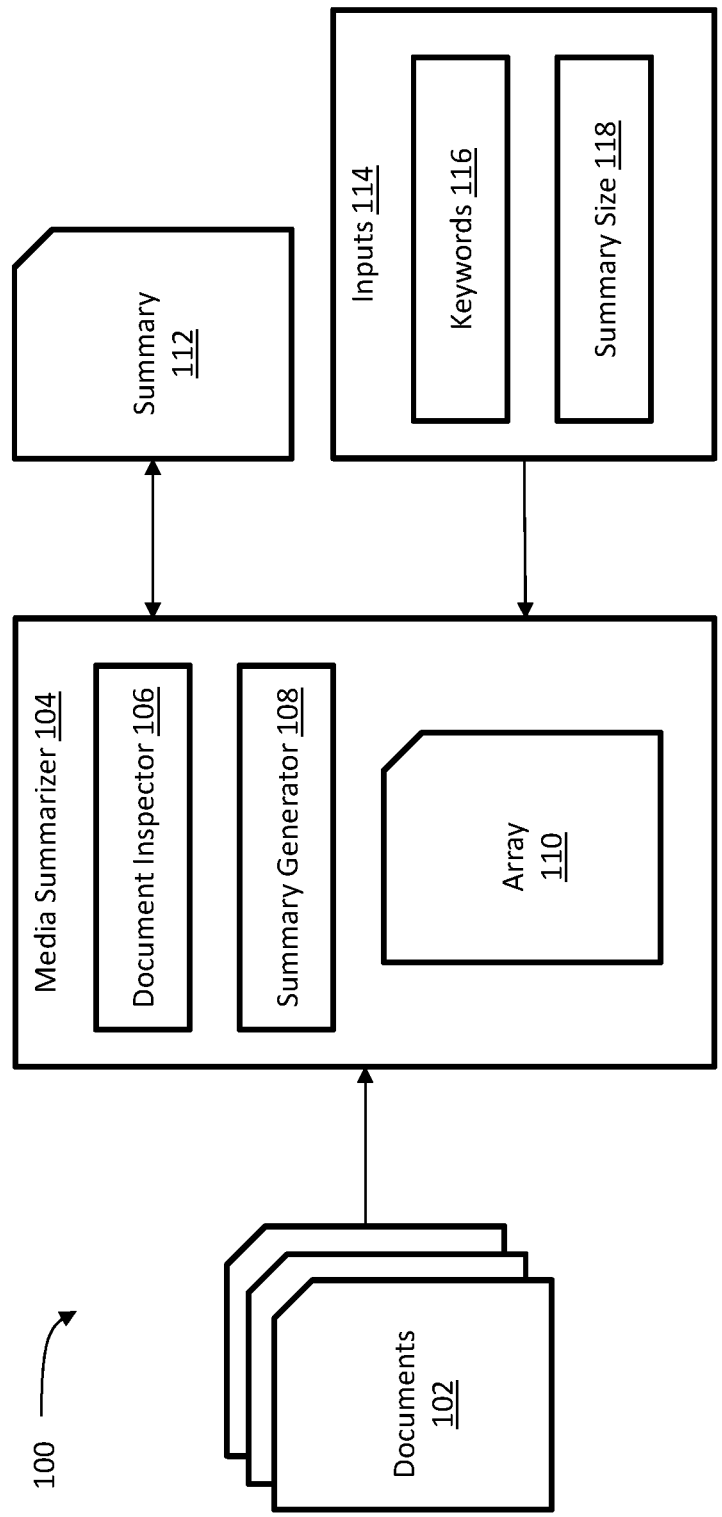

MEDIA SUMMARIZER

BACKGROUND

The present disclosure generally relates to media summarizers.

A tremendous amount of media may be accessible to consumers. Information of interest to a consumer may be included in one or more newspaper articles, books, magazine articles, blog entries, websites, and the like. Reviewing the various unaltered media sources for information may be a relatively inefficient way for a consumer to receive information of interest to the consumer.

The claimed subject matter is not limited to embodiments that solve any disadvantages or that operate only in environments such as those described above. This background is only provided to illustrate examples of where the present disclosure may be utilized.

SUMMARY

In one non-limiting embodiment, a media summarizer may include an inspector, an array, and a generator. The inspector may inspect a document and identify words included in the document. The inspector may further identify information associated with the words included in the document. The array may include the identified words of the document and the identified information associated with the identified words of the document. The generator may generate a summary of the document. The summary may include a subset of the identified words of the document.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

FIG. 1 is a diagram of an example media summarizer system.

DETAILED DESCRIPTION

Tremendous amounts of information is available from a large variety of sources. The information may be located in a variety of different document types. In the case of print media, reading the information may take relatively large amounts of time. In some instances, significant portions of the document may include information that is irrelevant, uninteresting, duplicative, or unnecessary for a user to read in order to extract the information the user considers important or is otherwise of interest to the user. Thus, for example, a document may go unread if the effort to read the document outweighs the potential benefit of the information a user may perceive the document contains. Similarly, a user reading a document may not be efficiently receiving the information from the document.

Furthermore, related information of interest to a user may be located in multiple different documents. For example, information may be contained in a text file such as a word processing document file, a portable document format (pdf) file including images and text, or the like. Alternately or additionally, information may be contained in an image file, such as a pdf including only images, a tagged image file format (TIFF) file, or the like. By way of example, information may be located in an image of a newspaper article, a book, or the like. Alternately or additionally, information may be located in one or more webpages, websites, or other internet-based documents or images. Alternately or additionally, information may be included in other computer files or locations, such as spreadsheet files, presentation files, database locations, of the like or any combination thereof.

Some embodiments may summarize information contained in one or more documents such that a reader may access the relevant information or most of the relevant information from the one or more documents with significantly less effort than would be needed to read through the entirety of the one or more documents. Thus, for example, a reader may gather information from a given document or documents in relatively less time than the reader would require to read the entirety of the document or documents. Similarly, a reader may gather relatively more information is a given amount of time. For clarity and convenience, any file that may include information of interest to a reader may be described herein as a document.

In some embodiments, a media summarizer may generate a summary of the document or documents. The summary may include portions of the document or documents. The portions the media summarizer included in the summary may include portions of the document or documents containing keywords identified by the media summarizer and/or by a user. The size of the summary may be determined by a user. For example, the user may instruct the media summarizer to create a summary having a particular size, such as one page, or a relative size, such as twenty-five percent of the size of the document or documents.

The selected portions included in the summary may be back linked to associated portions within the source document or documents. For example, a reader may select a portion of a summary to fetch and review the associated portion of the source document to determine a context of the selected portion of the summary, to review more details associated with the selected portion of the summary, or the like.

Reference will now be made to the figures wherein like structures will be provided with like reference designations. The drawings are non-limiting, diagrammatic, and schematic representations of example embodiments, and are not necessarily drawn to scale.

FIG. 1 is a diagram of an example media summarizer system 100.

The terms and words used in the following description and claims are not limited to the bibliographical meanings, but, are merely used to enable a clear and consistent understanding of the disclosure. It is to be understood that the singular forms "a," "an," and "the" include plural referents unless the context clearly dictates otherwise.

The media summarizer system 100 may include one or more documents 102. The documents 102 may be provided to a media summarizer 104. The media summarizer 104 may include a network-based service, such as an internet-based website or the like or any combination thereof. Alternately or additionally, the media summarizer 104 may include a program that may be installed at a computer, including a server, laptop computer, a desktop computer, a tablet computer, a mobile computing device such as a mobile phone, or the like or any combination thereof. The documents 102 may be located on a user device such as a user computer, at a network location such as the internet, or the like. The documents 102 may be provided to the media summarizer 104 by uploading, identifying the location of the documents 102 to the media summarizer 104, or the like. The location of the documents 102 may be identified through a uniform resource locator (URL), uniform resource identifier (URI), or the like.

Each of the documents 102 may be inspected by a document inspector 106 of the media summarizer 104. Inspecting the documents 102 may include performing optical character recognition (OCR) on the documents including images of text. For example, OCR may be performed on pdf files, TIFF files, or other image files, images embedded in otherwise text-based documents, such as images included in a web page or the like. Alternately or additionally, inspecting the documents may include web scraping, URL scraping, or the like. Alternately or additionally, inspecting the documents 102 may include identifying a font type associated with the words of the documents 102. Inspecting the documents 102 may include identifying a font size associated with the words of the documents 102. Alternately or additionally, inspecting the documents 102 may include identifying formatting associated with the words of the documents 102, such as identifying whether a word includes bold formatting, italic formatting, underline formatting, or the like or any combination thereof. Identifying the formatting may include identifying cases associated with the words of the documents 102, such as whether the first letter of the words are in uppercase, whether the full words are in uppercase, whether the full words are in lowercase, or the like. Alternately or additionally, identifying the formatting of the words of the documents 102 may include identifying other characteristics associated with the words, such as the color or colors of the characters, the justification of the words, whether the words are within quotation marks and/or in a block quote, whether the words are within parentheses or other brackets, whether the words are part of a bulleted or numbered list, whether the words are part of an equation, whether the words are part of a caption of an image, or the like or any combination thereof.

In some embodiments, further information may be derived and associated with the words of the documents 102. For example, the words may be associated with the document in which the words are found. Alternately or additionally, the documents may be divided by sentences and the words may be associated with the sentence in which the words are found. Idioms may be considered when dividing the documents 102 by sentences. Words that contain punctuation that commonly signify an end of a sentence may be identified and the punctuation may be ignored or may be subjected to additional scrutiny for the purpose of identifying sentences. For example, periods used in abbreviations such as Mr., Ms., Dr., a.m., p.m., and the like may be ignored or subjected to additional scrutiny. Alternately or additionally, exclamation marks used to signify factorial calculations, punctuation marks used as part of band names, and the like may be ignored or subjected to additional scrutiny. Thus, for example, a particular word may be associated with a first sentence of a first document or the like.

Alternately or additionally, the documents 102 may be divided into sections such as headings, bylines, tags, abstracts, headers, footers, footnotes, end notes, bodies, tables of contents, indexes, glossaries, or the like or any combination thereof. The words may be associated with the section in which the words are found. In some embodiments, font sizes, font types, and/or formatting may be used to identify sections of a documents. By way of example, a document may contain sections having a 36-point font size and bold characters, as well as sections having a 12-point font size and standard characters. The 36-point bold sections may be identified as a heading and the 12-point sections may be identified as a body of the document. In some embodiments, an average font size for a document may be determined and used in identifying sections of the document. For example, text having a first font size close to the average font size may be identified as body text, text having a second font size significantly larger than the average font size may be identified as heading text, and text having a third font size significantly smaller than the average text size may be identified as footnote text.

In some embodiments, the words of the documents 102 may be written to an array 110 along with the information identified and/or derived for the words. For example, the array 110 may include a first word, an entry associating the first word with a document of the documents 102, a font type, a font size, formatting, a section of the document, or the like or any combination thereof. Thus, for example, the document 102 may be additionally processed by considering the information in the array 110. Although described as a single array 110, the documents 102 and the associated information may be written to multiple arrays. For example, each the documents 102 may be written to a separate array 110.

A summary generator 108 of the media summarizer 104 may generate the summary 112. In some embodiments, the summary 112 may be generated based on one or more inputs 114. The inputs 114 may be entered by a user of the media summarizer 104. By way of example, the inputs 114 may include keywords 116 and/or a summary size 118.

In some embodiments the keywords 116 input may include instructions to the media summarizer 104 to automatically identify keywords and to generate the summary 112 based on the identified keywords. Alternately or additionally, the keywords 116 input may include one or more words supplied and/or otherwise identified by the user. For example, a user may identify a keyword from the summary 112 and the summary 112 may be updated to include the additionally identified keyword.

In some embodiments, in response to the keywords 116 input instructing the automatic identification of keywords, the summary generator 108 may count the number of times each word appears in the documents 102. Certain words may not be counted or otherwise automatically identified as keywords. For example, prepositions such as "a," "the," "to," "and," "of," "in," and the like may not be counted or otherwise automatically identified as keywords. In some embodiments, if a word appears a threshold number of times in the documents 102, is among the most often words in the documents 102, appears in particular sections of the documents, or the like, the word may be identified as a keyword. For example, a word that occurs ten or more times in the documents may be identified as a keyword. Alternately or additionally, the top five words that appear most often in the documents 102 may be identified as keywords. In some configurations, words that appear in the headings may be identified as keywords. Alternately or additionally, the keywords 116 input may include user-identified keywords.

Alternately or additionally, the summary size 118 may include a size identified by the user and the summary 112 may be generated based on the summary size 118. The summary size 118 may include a proportion of the documents 102. For example, the summary size 118 may indicate that the summary 112 should have a size of twenty-five percent of the combined size of the documents 102. For instance, for every four pages of the documents 102, the summary 112 may include approximately one page. Alternately, the relative size of the summary 112 may be based on the number of sentences, words, or the like in the documents 102 and the summary 112. In some embodiments, the summary size 118 input may identify a set size, such as two pages. The summary generator 108 may determine a proportion of the set summary size 118 input relative to the size of the documents 102. By way of example, if the set summary size 118 is two pages relative to eight total pages of documents 102, the proportion may be twenty-five percent.

The summary generator 108 may generate the summary 112 based on the keywords 116 and the summary size 118 inputs. In some embodiments, a percentage of the sentences from the documents 102 approximately equal to the proportional size of the summary 112 may be used to generate the summary 112. For example, where the summary size 118 input identifies a proportional summary size of twenty-five percent, one-fourth of the sentences of the documents 102 may be included in the summary 112. In some embodiments, the sentences may be taken from the documents 102 and included in the summary 112 according to a sampling pattern. For example, the summary generator 108 may take every fourth sentence from the documents 102 to generate the summary 112. The summary generator 108 may deviate from the sampling pattern based on the identified keywords. For example, the summary generator 108 may include all sentences including a keyword regardless of whether the sentences including the keywords would be selected in according to the sampling pattern. In some embodiments, the summary generator 108 may substitute a sentence including the keyword for a nearby keyword-free sentence that would otherwise be included based on the sampling pattern. Alternately or additionally, the summary generator 108 may determine a sample pattern for the sentences not including a keyword that may create a summary 112 consistent with the summary size 118 inputs. For example, assuming the documents 102 include 100 sentences, ten of the sentences include keywords, and the summary size 118 input identifies a relative summary size of twenty-five percent, the summary generator 108 may include one-sixth of the keyword-free sentences and all sentences with keywords from the documents 102 in the twenty-five sentence summary 112. Thus, for example, the keyword-free sentences may be sampled at relatively consistent intervals. In some embodiments, the sentences may appear in the summary 112 in an order the sentences appeared in the documents 102.

In some embodiments, the summary generator 108 may include back links in the summary 112. The back links may associate a portion of the summary 112, such as a sentence of the summary 112 to a portion of the documents 102 from which the portion of the summary 112 originated. For example, a reader may select a sentence of the summary 112 to fetch and review the associated portion of the source documents 102 to determine a context of the selected portion of the summary 112, to review more details associated with the selected portion of the summary 112, or the like. Thus, for example, a reader may be able to easily call up and review relevant portions of the documents 102 from the summary 112 to supplement the information found in the summary 112. In some embodiments, the reader may identify additional keywords 116 inputs from the fetched portions of the documents 102.

In some embodiments, the media summarizer system 100 may allow users to save summaries and/or share summaries. Alternately or additionally, the media summarizer system 100 may allow users to collaborate in creating and/or editing summaries. For example, the media summarizer system 100 may allow users to share the summary 112 and other generated summaries. The users may be granted permission to edit the summaries, such as identifying and/or removing keywords from the summaries. In some configurations, the media summarizer system 100 may prompt users to log in to the media summarizer system 100. The users may have access to summaries created by the users and to summaries shared with the user by other users, such as summaries shared to a team of users.

The embodiments described in this disclosure may include the use of a special purpose or general-purpose computer including various computer hardware or software modules, as discussed in greater detail below.

Embodiments within the scope of this disclosure also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

The terms used in this disclosure, and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). In addition, if a specific number of elements is introduced, this may be interpreted to mean at least the recited number, as may be indicated by context (e.g., the bare recitation of "two recitations," without other modifiers, means at least two recitations, or two or more recitations). As used in this disclosure, any disjunctive word and/or phrase presenting two or more alternative terms should be understood to contemplate the possibilities of including one of the terms, either of the terms, or both terms. For example, the phrase "A or B" will be understood to include the possibilities of "A" or "B" or "A and B."

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A media summarizer comprising:
   an inspector to inspect a document for identifying words included in the document and information associated with the words included in the document;
   an array including the identified words of the document and the identified information associated with the identified words of the document; and
   a generator to generate a summary of the document, the summary including a subset of the identified words of the document, wherein the summary includes a first plurality of sentences from the document and a second plurality of sentences from the document, the first plurality of sentences including all sentences from the document that include a first keyword and wherein the second plurality of sentences are selected according to a sampling pattern of sentences from the document that do not include the first keyword.

2. The media summarizer of claim 1, wherein the summary is of a particular size set by a user.

3. The media summarizer of claim 1, wherein the summary is of a relative size set by a user.

4. The media summarizer of claim 1, wherein a portion of the summary includes a link to an associated portion of the document.

5. The media summarizer of claim 1, wherein the inspector inspects the documents using optical character recognition (OCR).

6. The media summarizer of claim 1, wherein the inspector inspects the document based at least in part on identifying formatting associated with the words included in the document.

7. The media summarizer of claim 1, wherein the generator generates the summary based on at least one keyword, including the first keyword, the at least one keyword automatically identified by the generator in response to input from a user instructing the generator to automatically identify the at least one keyword.

8. The media summarizer of claim 7, wherein the at least one keyword is identified by the generator based on a count of occurrences of the at least one keyword in the document.

9. The media summarizer of claim 1, wherein the generator generates the summary based on at least one keyword identified by a user.

10. The media summarizer of claim 1, wherein, based at least in part on a keyword identified in the summary by a user, the generator further updates the summary.

11. The media summarizer of claim 1, wherein the media summarizer is configured to save the summary and to share the summary.

12. A media summarizer comprising:
   an inspector to inspect a plurality of documents for identifying words included in the plurality of documents and information associated with the words included in the plurality of documents;
   an array including the identified words of the plurality of documents and the identified information associated with the identified words of the plurality of documents; and
   a generator to generate a summary of the plurality of documents, the summary including a subset of the identified words of the plurality of documents, wherein the summary includes a first plurality of sentences from the plurality of documents and a second plurality of sentences from the plurality of documents, the first plurality of sentences including all sentences from the plurality of documents that include a first keyword and wherein the second plurality of sentences are selected according to a sampling pattern of sentences from the plurality of documents that do not include the first keyword.

13. The media summarizer of claim 12, wherein the summary is of a particular size set by a user.

14. The media summarizer of claim 12, wherein the summary is of a relative size set by a user.

15. The media summarizer of claim 12, wherein a portion of the summary includes a link to an associated portion of the plurality of documents.

16. The media summarizer of claim 12, wherein the inspector inspects a first at least one document of the plurality of documents using optical character recognition (OCR) and wherein the inspector inspects a second at least one document of the plurality of documents based at least in part on identifying formatting associated with the words included in the second at least one document of the plurality of documents.

17. The media summarizer of claim 12, wherein the generator generates the summary based on at least one keyword automatically identified by the generator in response to input from a user instructing the generator to automatically identify the at least one keyword.

18. The media summarizer of claim 17, wherein the at least one keyword is identified by the generator based on a count of occurrences of the at least one keyword in the plurality of documents.

19. The media summarizer of claim 12, wherein the generator generates the summary based on at least one keyword identified by a user.

20. The media summarizer of claim 12, wherein, based at least in part on a keyword identified in the summary by a user, the generator further updates the summary.

\* \* \* \* \*